US009230331B2

(12) United States Patent
Shaham et al.

(10) Patent No.: US 9,230,331 B2
(45) Date of Patent: Jan. 5, 2016

(54) SYSTEMS AND METHODS FOR REGISTRATION OF ULTRASOUND AND CT IMAGES

(71) Applicant: Samsung Electronics Co., Ltd., Gyeonggi-do (KR)

(72) Inventors: Amir Shaham, Givat Shmuel (IL); Ido Yerushalmy, Tel-Aviv (IL); Eran Itan, Hadera (IL); Orna Bregman-Amitai, Tel-Aviv (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 106 days.

(21) Appl. No.: 14/058,417

(22) Filed: Oct. 21, 2013

(65) Prior Publication Data
US 2015/0110373 A1   Apr. 23, 2015

(51) Int. Cl.
*G06K 9/00* (2006.01)
*G06T 7/00* (2006.01)
(52) U.S. Cl.
CPC ............. *G06T 7/0081* (2013.01); *G06T 7/0012* (2013.01); *G06T 7/0026* (2013.01); *G06T 7/0032* (2013.01); *G06T 7/0097* (2013.01); G06T 2207/10081 (2013.01); G06T 2207/10136 (2013.01); G06T 2207/20016 (2013.01); G06T 2207/20032 (2013.01); G06T 2207/20036 (2013.01); G06T 2207/30048 (2013.01); G06T 2207/30101 (2013.01)
(58) Field of Classification Search
None
See application file for complete search history.

(56) References Cited

U.S. PATENT DOCUMENTS

| 2010/0081920 | A1* | 4/2010 | Whitmore et al. | 600/424 |
|---|---|---|---|---|
| 2011/0028843 | A1* | 2/2011 | Hyun et al. | 600/443 |
| 2011/0137152 | A1* | 6/2011 | Li | 600/424 |
| 2011/0216958 | A1* | 9/2011 | Satoh et al. | 382/131 |
| 2012/0143055 | A1* | 6/2012 | Ng et al. | 600/439 |
| 2013/0182924 | A1* | 7/2013 | Lause | 382/131 |
| 2014/0193053 | A1* | 7/2014 | Kadoury et al. | 382/131 |

OTHER PUBLICATIONS

Brown, Matthew S., et al. "Method for segmenting chest CT image data using an anatomical model: preliminary results." Medical Imaging, IEEE Transactions on 16.6 (1997): 828-839.*
Sra, Jasbir. "Cardiac image registration." JAFIB 1.3 (2008): 145-160.*
Meyer, Carsten, et al. "A multi-modality segmentation framework: application to fully automatic heart segmentation." SPIE Medical Imaging. International Society for Optics and Photonics, 2009.*

(Continued)

*Primary Examiner* — Aaron W Carter
*Assistant Examiner* — Narek Zohrabyan

(57) ABSTRACT

A computerized method for model-less segmentation and registration of ultrasound (US) with computed tomography (CT) images of an organ with a fluid filled chamber. The method is based on correlating between the US image(s) and the CT image(s) by processing the US image(s) by iteratively expanding the CT image segment so that the expanded CT image segment is correlated with the visual boundaries of the US image segment; transforming the CT image(s) according to an estimated US transducer position and estimated US beam direction related to the US image(s) so that at least one of shape and volume of the organ in the CT image is adapted with at least one of shape and volume of the organ of the US image, to form a CT image representation which is correlated with US image(s).

18 Claims, 13 Drawing Sheets
(6 of 13 Drawing Sheet(s) Filed in Color)

(56) References Cited

OTHER PUBLICATIONS

Maintz, JB Antoine, and Max A. Viergever. "A survey of medical image registration." Medical image analysis 2.1 (1998): 1-36.*

Karthikeyan, A., and M. Valliammai. "Lungs Segmentation using Multi-level Thresholding in CT Images." IJECSE vol. 1, No. 3, (2012): 1509-1513.*

Shareef, Naeem, DeLiang L. Wang, and Roni Yagel. "Segmentation of medical images using LEGION." Medical Imaging, IEEE Transactions on 18.1 (1999): 74-91.*

Camara, O., et al. "3D nonlinear PET-CT image registration algorithm with constrained Free-Form Deformations." 3rd IASTED International conference of Visualization, Imaging, and Image Processing. 2003.*

Huang, Xishi, et al. "Dynamic 2D ultrasound and 3D CT image registration of the beating heart." Medical Imaging, IEEE Transactions on 28.8 (2009): 1179-1189.*

Huang et al. "Rapid Dynamic Image Registration of the Beating Heart for Diagnosis and Surgical Navigation", IEEE Transactions on Medical Imaging, 28(11): 1802-1814, Nov. 2009.

* cited by examiner

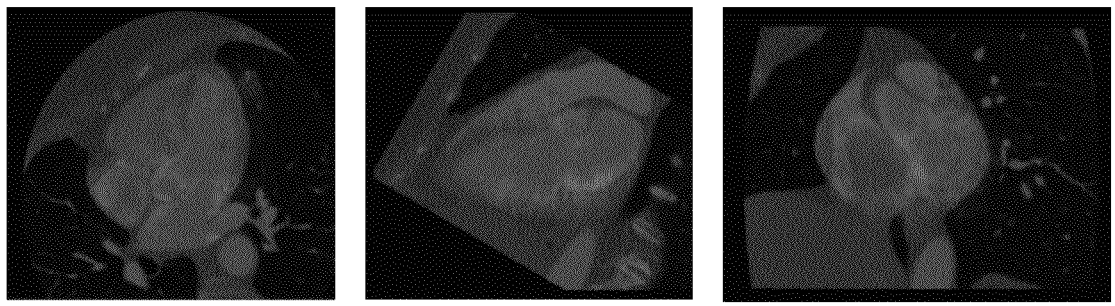
FIG. 16
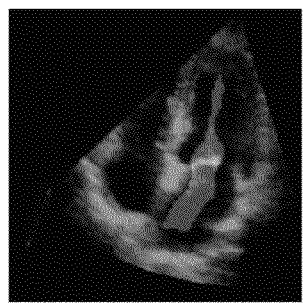 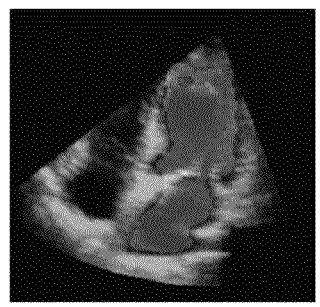 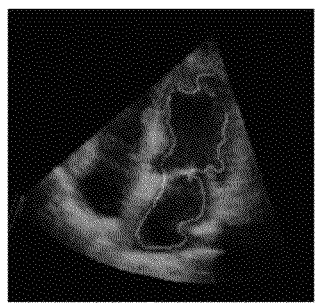
FIG. 17A  FIG. 17B  FIG. 17C
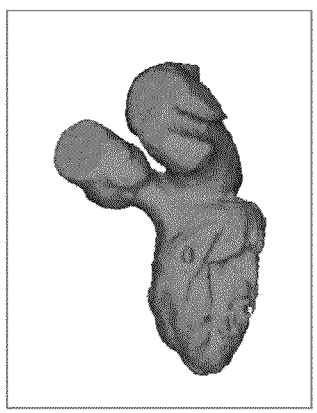 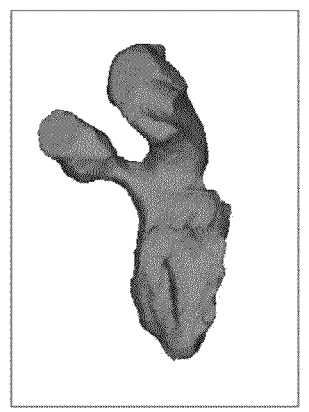 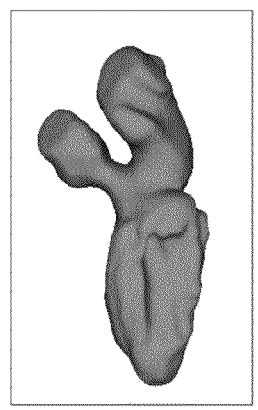
FIG. 18A  FIG. 18B  FIG. 18C

SYSTEMS AND METHODS FOR REGISTRATION OF ULTRASOUND AND CT IMAGES

FIELD AND BACKGROUND OF THE PRESENT INVENTION

The present invention, in some embodiments thereof, relates to systems and/or methods for image registration and, more particularly, but not exclusively, to systems and/or methods for registration of ultrasound and Computed Tomography CT and/or Magnetic Resonance (MR) images.

Physicians may use several imaging modalities when examining the heart of a patient. Each imaging modality may provide better imaging detail of some tissue types and/or tissue functionalities, but poor imaging of other tissue types and/or functionalities. Therefore, several different modalities may be used to gain an overall clinical picture.

Ultrasound may be used to provide dynamic and/or functional information of the beating heart. Ultrasound may also provide images of the function of the cardiac valves. Computed tomography may provide detailed examination of the heart structure, for example, chambers, blood vessels, connective tissue and/or muscle tissues. However, due to limitations in radiation exposure of the patient, fewer samples may be acquired at different stages of the cardiac cycle, yielding high quality images at some time phases and low quality images at other time phases.

US and CT imaging modalities may be different in terms of, for example, image artifacts, intensity levels and/or spatial shape differences. The differences may be due to physical processes related to image formation of each modality. Ultrasound images are obtained by echo (i.e., reflection) of acoustic waves. CT images are obtained from X-rays, optionally accompanied by injected contrast agents. The differences in the image modalities raise difficulties in registering the US and CT images.

Various attempts have been made to align US and CT images, in order to fuse the information of both modalities and enable better diagnosis, follow up and visualization during treatment procedures. However, the differences in the modalities, for example, image artifacts, intensity levels, and spatial shape differences due to physics related to image formation in each modality, have made image registration challenging.

Huang et al., "Rapid dynamic image registration of the beating heart for diagnosis and surgical navigation." IEEE Trans Med Imaging. 2009 November; 28(11):1802-14. discloses "... a rapid two-step method for registering RT3D US to high-quality dynamic 3-D MR/CT images of the beating heart. This technique overcomes some major limitations of image registration (such as the correct registration result not necessarily occurring at the maximum of the mutual information (MI) metric) using the MI metric."

SUMMARY OF THE PRESENT INVENTION

An aspect of some embodiments of the present invention relates to computerized methods of model-less segmentation of ultrasound (US) and computed tomography (CT) and/or MR images of the heart, the segmentation calculated using data from the other imaging modality so as to improve registration accuracy.

According to an aspect of some embodiments of the present invention there is provided a computerized method for model-less segmentation and registration of ultrasound (US) with computed tomography (CT) images of a portion of a patient, comprising: obtaining at least one US image and at least one CT image of at least a portion of an organ; identifying a CT image segment of the at least one CT image that depicts at least one fluid filled chamber of said organ; identifying an US image segment of the fluid filled chamber in the at least one US image; correlating between the at least one US image and the at least one CT image by processing the at least one US image by iteratively expanding the CT image segment so that the expanded CT image segment is correlated with the visual boundaries of the US image segment; transforming the at least one CT image according to an estimated US transducer position and estimated US beam direction related to the at least one US image so that at least one of shape and volume of the organ in the CT image is adapted with at least one of shape and volume of the organ of the US image, to form a CT image representation which is correlated with the at least one US image; registering the correlated US image and the correlated CT image to form a registered image; and displaying the registered image.

According to some embodiments of the invention, the organ comprises a heart.

According to some embodiments of the invention, transforming the at least one CT image comprises dilating segments of the organ in the CT image.

According to some embodiments of the invention, the method further comprises eroding the CT chamber segments to fit within the chamber of the US image.

According to some embodiments of the invention, transforming the at least one CT image comprises uniting the CT segments and differentially eroding the united CT segments to compensate for US noise.

According to some embodiments of the invention, the method further comprises: identifying volumetric representations of the chambers and surrounding tissue in the CT segments and of the US image; registering the identified volumetric representations to provide an initial rigid transformation; and wherein correlating comprises correlating between the at least one US image and the at least one CT image by processing the at least one US image by iteratively expanding a rigid transformed seed segment based on the CT image segment and said initial rigid transformation, so that the expanded CT image segment is correlated with the visual boundaries of the US image segment.

According to some embodiments of the invention, wherein identifying the CT image segment of the at least one CT image comprises model-less segmenting the CT image into the CT segments, wherein model-less segmenting the CT image comprises: coarsely segmenting the CT image using a Hounsfield value threshold so that contrast enhanced regions that are connected and include a mitral annulus marking are identified; extracting from the coarsely segmented image a left atrium (LA) and a left ventricle (LV) using apex and atrium markings; and subtracting the LA-LV segment from the coarse segment and detecting the connected component closest to an aortic valve marking to extract the aorta.

According to some embodiments of the invention, the method further comprises enhancing organ tissue of the US image by enhancing the organ tissue of the whole captured region, to create a US volumetric representation for registration.

According to some embodiments of the invention, the method further comprises segmenting the tissue of the organ of the CT image by locally analyzing intensity of the tissue of each region, to create a CT volumetric representation for registration. Optionally, segmenting the organ tissue comprises assigning a classification grade to voxels around and inside the organ tissue so that voxels are determined to be inside the organ tissue or outside the organ tissue according to the classification grade. Optionally, the CT representation is dilated to compensate for US noise, for increasing similarity with the US image. Optionally, the method further comprises using a parametric model to estimate the parameters as part of the registration.

According to some embodiments of the invention, the CT image representation is assigned weights to improve accuracy of local registration according to a cost function.

According to some embodiments of the invention, the registering is performed using rigid volumetric intensity registration, and further comprising applying additional non-rigid constrained affine registration correction to accommodate small deformations.

According to some embodiments of the invention, registering comprises registering with outliers rejection.

According to some embodiments of the invention, registering comprises registering with automatic matched anatomical parts labeling constrains.

According to some embodiments of the invention, magnetic resonance (MR) images are used instead of CT images.

According to an aspect of some embodiments of the present invention there is provided a system for model-less segmentation and registration of ultrasound (US) with computed tomography (CT) images of the heart, the system comprises: a processor; and a memory in electrical communication with the processor, the memory having stored thereon: a module for obtaining at least one US image and at least one CT image of at least a portion of an organ; a module for identifying a CT image segment of the at least one CT image that depicts at least one fluid filled chamber of said organ; a module for identifying an US image segment of the fluid filled chamber in the at least one US image; a module for correlating between the at least one US image and the at least one CT image by processing the at least one US image by iteratively expanding the CT image segment so that the expanded CT image segment is correlated with the visual boundaries of the US image segment; a module for transforming the at least one CT image according to an estimated US transducer position and estimated US beam direction related to the at least one US image so that at least one of shape and volume of the organ in the CT image is adapted with at least one of shape and volume of the organ of the US image, to form a CT image representation which is correlated with the at least one US image; a module for registering the correlated US image and the correlated CT image to form a registered image; and a module for displaying the registered image.

According to some embodiments of the invention, the system further comprises: a user input unit in electrical communication with the processor, the user input unit adapted for allowing a user to place markings on the US and CT images; and a module for registering the at least one US image and the at least one CT image according to the image markings, to form an initial landmark registration that provides data for the identifying of one or both of the US image segment and the CT image segment.

According to an aspect of some embodiments of the present invention there is provided a computer program product for computing, the computer program product comprising: one or more non-transitory computer-readable storage mediums, and program instructions stored on at least one of the one or more storage mediums, the program instructions comprising: program instructions for obtaining at least one US image and at least one CT image of at least a portion of an organ; program instructions for identifying a CT image segment of the at least one CT image that depicts at least one fluid filled chamber of said organ; program instructions for identifying an US image segment of the fluid filled chamber in the at least one US image; program instructions for correlating between the at least one US image and the at least one CT image by processing the at least one US image by iteratively expanding the CT image segment so that the expanded CT image segment is correlated with the visual boundaries of the US image segment; program instructions for transforming the at least one CT image according to an estimated US transducer position and estimated US beam direction related to the at least one US image so that at least one of shape and volume of the organ in the CT image is adapted with at least one of shape and volume of the organ of the US image, to form a CT image representation which is correlated with the at least one US image; program instructions for registering the correlated US image and the correlated CT image to form a registered image; and program instructions for displaying the registered image.

Unless otherwise defined, all technical and/or scientific terms used herein have the same meaning as commonly understood by one of ordinary skill in the art to which the present invention pertains. Although methods and materials similar or equivalent to those described herein can be used in the practice or testing of embodiments of the present invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the present invention can involve performing or completing selected tasks manually, automatically, or a combination thereof. Moreover, according to actual instrumentation and equipment of embodiments of the method and/or system of the present invention, several selected tasks could be implemented by hardware, by software or by firmware or by a combination thereof using an operating system.

For example, hardware for performing selected tasks according to embodiments of the present invention could be implemented as a chip or a circuit. As software, selected tasks according to embodiments of the present invention could be implemented as a plurality of software instructions being executed by a computer using any suitable operating system. In an exemplary embodiment of the present invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the present invention are herein described, by way of example only, with reference to the accompanying drawings and/or images. With specific reference now to the drawings in detail, it is stressed that the particulars shown are by way of example and for purposes of illustrative discussion of embodiments of the present invention. In this regard, the description taken with the drawings makes apparent to those skilled in the art how embodiments of the present invention may be practiced.

In the drawings:

FIG. 1A is a high-level flowchart of an exemplary computerized method of model-less segmentation and registration of an ultrasound (US) image and a CT image, in accordance with exemplary embodiments of the present invention;

FIG. 1B is a detailed version of FIG. 1A, in accordance with exemplary embodiments of the present invention;

FIG. 2 is a block diagram of manual user inputs for the method of FIGS. 1A-B, in accordance with exemplary embodiments of the present invention;

FIG. 3 is a flowchart of a computerized method of model-less segmentation of chambers and/or vessels of the CT image, in accordance with exemplary embodiments of the present invention;

FIG. 4 is a flowchart of a computerized method of model-less segmentation of tissues of the CT image, in accordance with exemplary embodiments of the present invention;

FIG. 5 is a flowchart of a computerized method of enhancing tissue of the US image, in accordance with exemplary embodiments of the present invention;

FIG. 6 is a flowchart of a computerized method of model-less segmentation of the US image, in accordance with exemplary embodiments of the present invention;

FIG. 7 is a flowchart of a computerized method of forming a CT shape with compensation for US effects, in accordance with exemplary embodiments of the present invention;

FIG. 8 is a block diagram of an exemplary system for model-less segmentation and registration of CT and US images, in accordance with exemplary embodiments of the present invention;

FIGS. 9A-9B are exemplary images of a CT angiography (CTA) scan showing the results of threshold based model-less segmentation, in accordance with exemplary embodiments of the present invention;

FIG. 10 is an exemplary image of a CTA scan showing the extracted left ventricle and left atrium, in accordance with exemplary embodiments of the present invention;

Figure 11A:
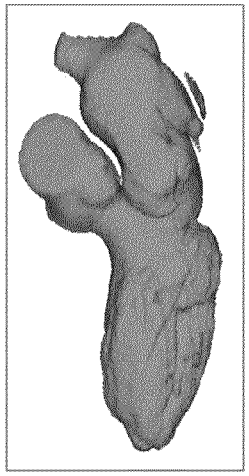
Figure 11B:
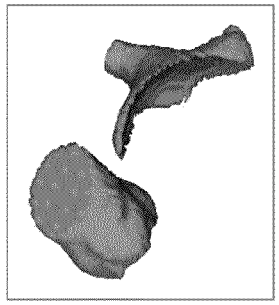
Figure 11C:
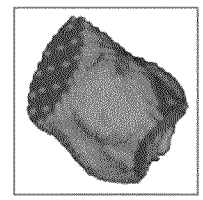
Figure 12:
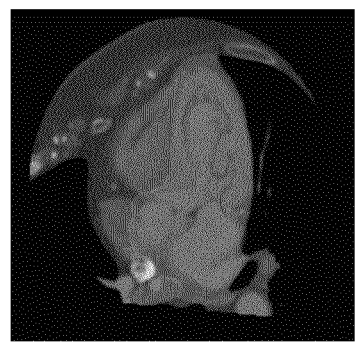
Figure 12:
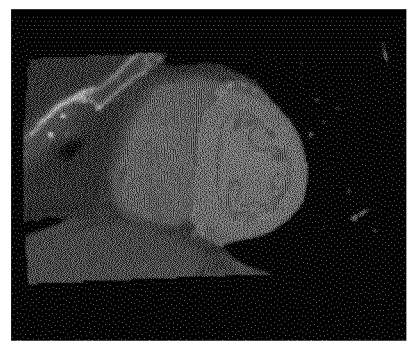
Figure 12:
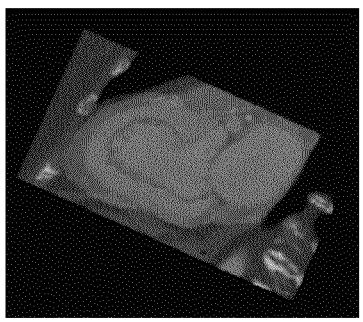
Figure 12:
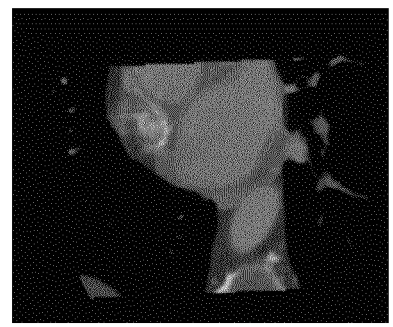
Figure 13:
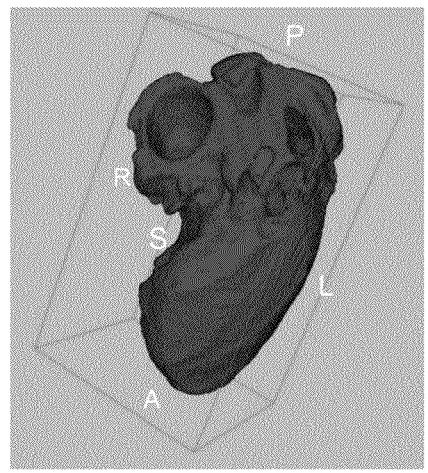
Figure 14:
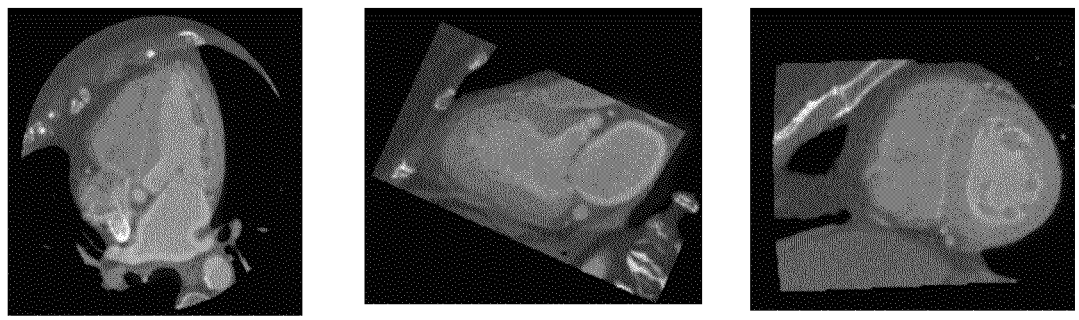
Figure 15:
Figure 19:
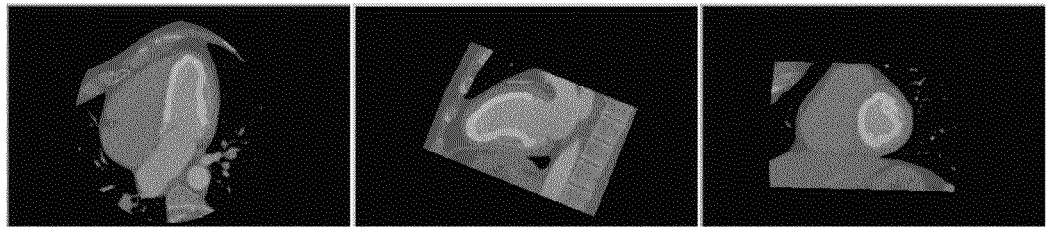
Figure 20:
Figure 21:
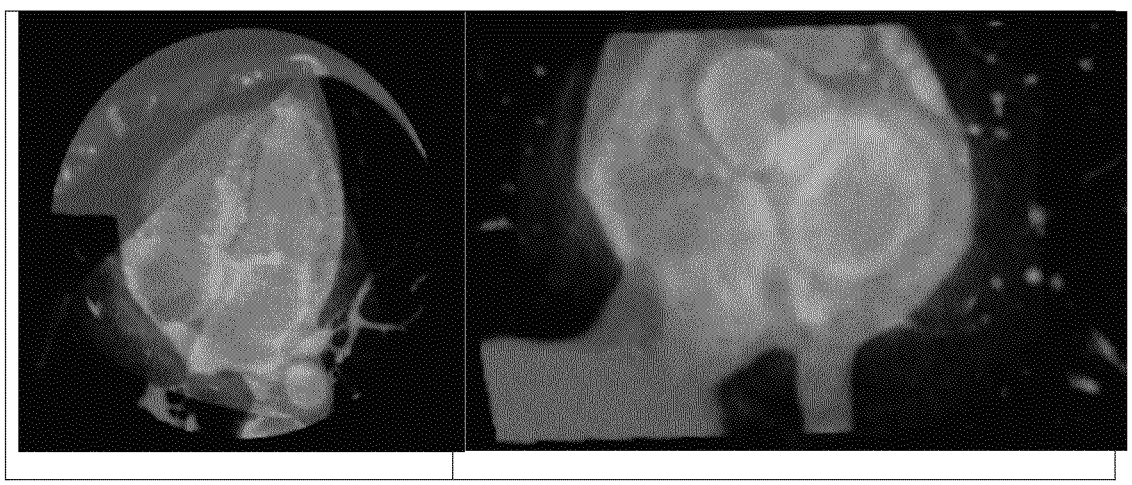

FIGS. 11A-11C are exemplary images showing the extraction of the aorta component from the CTA scan, in accordance with exemplary embodiments of the present invention;

FIG. 12 is an exemplary image of a CTA myocardial analysis, in accordance with exemplary embodiments of the present invention;

FIG. 13 is another exemplary image of a CTA myocardial analysis, in accordance with exemplary embodiments of the present invention;

FIG. 14 is an exemplary image of a CT heart tissue representation, in accordance with exemplary embodiments of the present invention;

FIG. 15 is an exemplary image of an US heart tissue representation, in accordance with exemplary embodiments of the present invention;

FIG. 16 is an exemplary image of a rigid volumetric registration of CT and US images, in accordance with exemplary embodiments of the present invention;

FIGS. 17A-17C are exemplary images illustrating the use of a seed extracted from a CT atlas to model-less segment the US image, in accordance with exemplary embodiments of the present invention;

FIGS. 18A-18C are exemplary images illustrating the erosion of a CT shape according to US parameters, in accordance with exemplary embodiments of the present invention;

FIG. 19 is an exemplary image illustrating weighted regions, in accordance with exemplary embodiments of the present invention;

FIG. 20 is an exemplary image of shape registration, with outliers rejection, for endocardium surfaces of CT and US images, in accordance with exemplary embodiments of the present invention; and FIG. 21 is an exemplary image of shape registration refinement of the CT and US images, in accordance with exemplary embodiments of the present invention.

DESCRIPTION OF SPECIFIC EMBODIMENTS OF THE PRESENT INVENTION

The present invention, in some embodiments thereof, relates to systems and/or methods for image registration and, more particularly, but not exclusively, to systems and/or methods for registration of ultrasound and CT and/or MR images.

An aspect of some embodiments of the present invention relates to a computerized method of model-less segmentation and/or registration of ultrasound (US) images using data from computed tomography (CT) images and/or MR images, optionally CT angiography (CTA) images. In exemplary embodiments, the US and CT images depict at least a portion of an organ with at least one fluid filled chamber. In exemplary embodiments, the US model-less segmentation and/or registration is performed by correlating between the US image and the CT image. Optionally, Fluid-containing chamber segments and/or surrounding tissue are represented by volumetric and/or shape representations. Optionally, an initial volumetric registration is performed with the volumetric and/or shape representations. A transformed CT image segment is iteratively expanded within a chamber and/or vessel in the US image to correlate with visual boundaries of the US image chamber and/or vessel, for an US shape representation, optionally, using data from the initial volumetric registration.

Alternatively or additionally, the CT images are model-less segmented using data from the US images. In exemplary embodiments, the CT image is transformed according to an estimated US transducer position and/or beam direction related to the corresponding US image and/or expected noise parameters. Optionally, the CT shape and/or volumetric representations are deformed according the expected US noise parameters. Optionally, the deformation is performed by dilating tissue segments and/or eroding chamber segments. Advantageously, the transformation improves the registration accuracy, as the segments being registered are made more anatomically similar by the transformation.

In exemplary embodiments, the correlated images are registered. Advantageously, model-less segmenting the US and/or CT and/or MR images according to images from the other imaging modality may improve the accuracy of the registration, as the image segments being registered are made more anatomically similar by the segmentation method. The level of similarity of the registration may be determined, for example, by a registration algorithm cost function.

Optionally, the US images are three dimensional (3D) images. For example, the images provided are 2D slices taken from a 3D scan. The 2D slices may be provided for display convenience, however the algorithm may use 3D data. In exemplary embodiments, the CTA images are 3D images. Alternatively, the US images and/or the CTA images are two dimensional (2D).

Optionally, the segmentation is performed model-less. Optionally, the segmentation is performed without prior anatomical knowledge of the heart and/or nearby structures such as the lungs and/or bones (e.g., ribs, spine). Optionally, important anatomical regions and/or landmarks are automatically detected. Optionally, no reference atlas (e.g., from other patients) is used. Optionally, the model-less segmentation is patient specific. Optionally, a user (e.g., physician) marks one or more landmarks on the CT and/or US image for the specific patient. Advantageously, the model-less segmentation is more accurate, as errors due to anatomical variations of other patients are non-existent.

Optionally, the model-less segmentation is performed on the left side of the heart, to segment the left atrium, left ventricle, ascending aorta and/or surrounding tissues thereof (e.g., myocardium, heart valves, connective tissue). Alternatively or additionally, the model-less segmentation is performed on the right side of the heart, of the right atrium, right ventricle, pulmonary artery, and/or surrounding tissues.

Optionally, the volume and/or shape registration methods may be performed without rigidity. Alternatively, the registration is performed in two stages, a first rigid stage and a second non-rigid refinement stage.

As used herein, the term "heart tissue" means the tissues of the walls of the heart, and includes the myocardium, the base of the aorta, as well as other tissue features, for example, small blood vessels and/or epicardium.

In exemplary embodiments, the model-less segmentation and/or registration is performed on images of the heart, for example, to analyze heart tissue. Inventors discovered that the heart has a structure suitable for volumetric and/or shape registration methods that may improve alignment of the CT and US images. Without being bound to theory, the heart is composed of fluid filled chambers and/or vessels, surrounded by heart tissue. Parameters of interest include, for example, the size and/or shape of the chambers, and/or the thickness of the heart tissue. The heart may be analyzed in terms of the volume of the chambers and/or vessels, and the shape of the heart tissue. The method and/or system as described herein may also be used to model-less segment and/or register other organs and/or tissues with fluid filled chambers, for example, the urinary system (e.g., kidney, ureter, bladder), uterus and/or fallopian tubes (i.e., artificially filled with fluid), and/or large blood vessels (e.g., aorta, vena cava, femoral artery).

Before explaining at least one embodiment of the present invention in detail, it is to be understood that the present invention is not necessarily limited in its application to the details of construction and the arrangement of the components and/or methods set forth in the following description and/or illustrated in the drawings and/or the Examples. The present invention is capable of other embodiments or of being practiced or carried out in various ways.

Figure 1A:
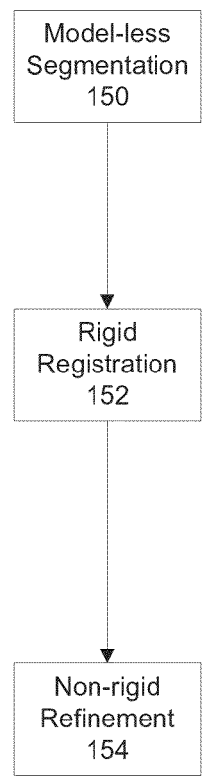
Figure 1B:
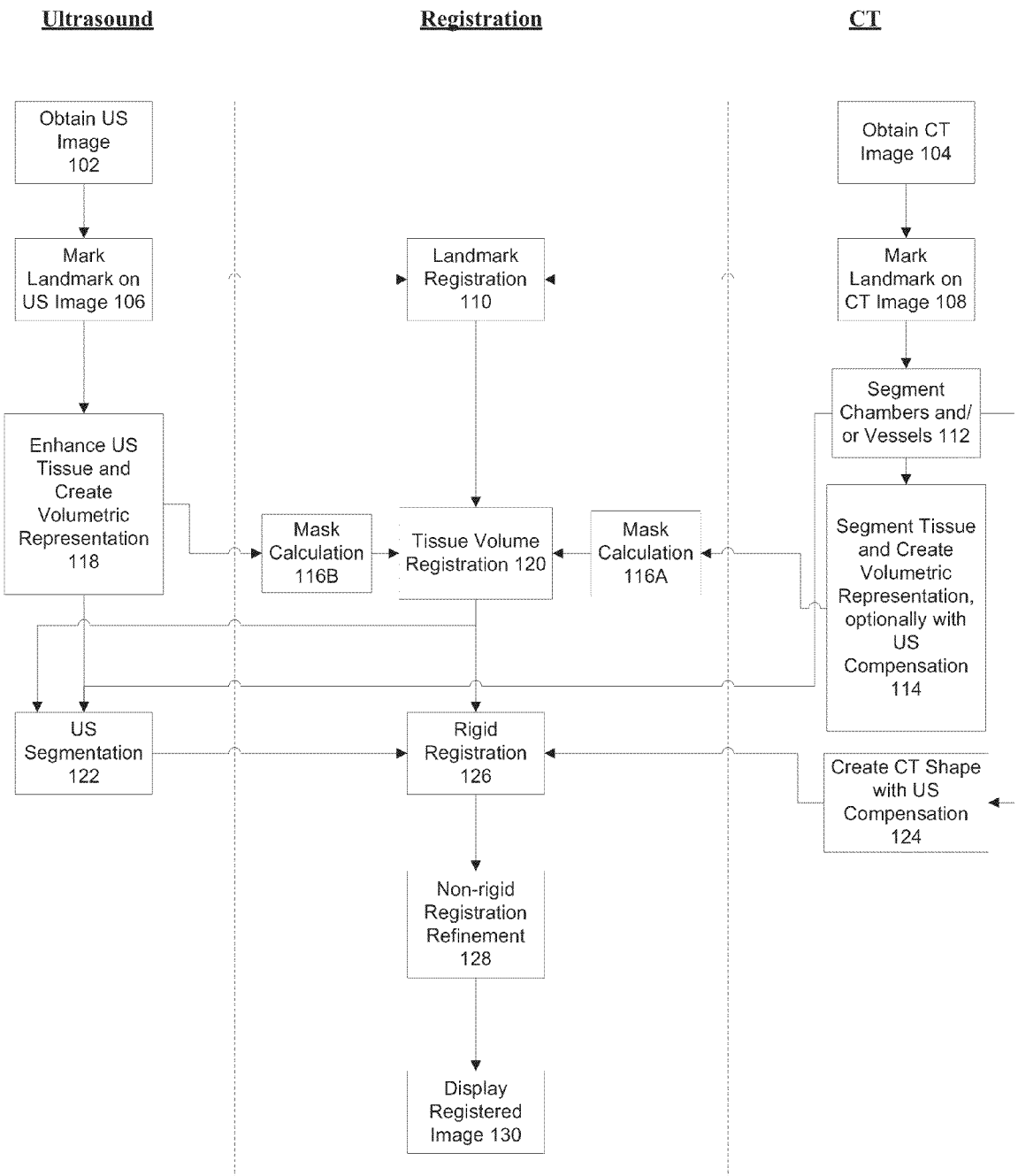

Referring now to the drawings, FIG. 1A is a high-level flowchart of a computerized and/or automated method of model-less segmentation of US images and CT images to register images, in accordance with exemplary embodiments of the present invention. FIG. 1B is a detailed version of FIG. 1A. Optionally, the US and/or CT images are correlated and/or transformed using data from the other modality. Optionally, the registered images are further refined. Advantageously, calculations are performed on the US and CTA, producing 3D volume representations of the heart tissue designed for effective volume registration. Advantageously, the model-less segmentation, the correlation, the transformation and/or the refinement improve the registration accuracy.

At 150, the US and/or CT images are segmented without a model. In exemplary embodiments, the model-less segmentation uses data obtained from the other modality, for example, CT images are used to segment US images.

In exemplary embodiments, representations of the heart tissue from CTA and US images are calculated so that the representations have higher correlation of tissue data and/or reduced noise and/or reduced outlying information. Advantageously, the representations may increase the accuracy of the registration using an intensity volumetric registration approach.

At 152, rigid registration is performed on the CT and US images.

The heart has at least some salient geometrical structures that are visible using both US and CT, for example, the myocardium, chambers and main vessels. Registration may be performed using the similar volumetric and/or geometrical representations of the sub-organ structures.

Using the model-less segmentation representations, some differences resulting from the US and CT modalities are reduced and/or suppressed. Advantageously, volumetric and/or shape registration methods may be used with improved effectiveness.

The rigid registration may be performed using volumetric registration of heart tissue volumetric representations, for example, as described hereinabove.

At 154, the registered images are refined. Optionally, a version of the iterated closest point (ICP) algorithm with outliers rejection, is applied to refine the image, for example, a constrained affine registration as a non-rigid correction to the rigid transform.

Optionally, anatomical shapes, such as salient endocardium subsurface shapes are extracted from the CT and/or US images. The shapes are used to refine the registration accuracy.

Optionally, weights may be assigned to different parts of the heart (e.g., aorta, left ventricle, left atrium). Advantageously, consideration of the weights may allow the registration process to produce more accurate results in pre-defined parts. The weights may be defined automatically (e.g., according to desired application), and/or manually (e.g., by the user).

Reference is now also made to FIG. 1B, for additional detail of the boxes of FIG. 1A, in accordance with exemplary embodiments of the present invention.

At 102, an US image of the heart is obtained. Optionally, the US image is a transthoracic echocardiogram (TTE) (i.e., produced from an US transducer probe placed on the skin of the chest of the patient). The probe is positioned, for example, at the apex, parasternally, in proximity to the aortic valve, or other positions. Alternatively, US images may be obtained from probes placed at other positions, for example, transesophageal echocardiography (TEE).

At 104, at least one CT image is obtained. Optionally, contrast is injected into the vasculature of the patient as part of the scanning processes. Optionally, the injection is synchronized with the CT scan to obtain at least one CTA image of the left ventricle, left atrium and/or the base of the aorta.

Optionally, the capture time in the heart cycle is about at the 75% cycle point (i.e., mid-diastole phase) for both the US and CTA modalities. In the diastolic phase the changes in the region of interest are relatively reduced. A coarse time match may be sufficient.

Optionally, an automatic spatio-temporal registration program may use 4D US input data to obtain more precise cycle time in the US data, and thereby to register to a temporal correct volumetric sample of the US volume sequence.

Optionally, the CTA and/or US images are processed to provide images with identity direction and/or isotropic sampling.

Optionally, at 106, landmarks are marked on the US image. Optionally, landmarks are manually marked by the user (e.g., physician, technician), for example, by using mouse to direct a pointer to the region of interest and clicking a button to place an 'X' on the image. Alternatively, software automatically recognizes and marks the landmarks. Alternatively, the landmarks are automatically identified.

Optionally, at 108, landmarks are marked on the CTA image, in a manner similar to that described above for US.

Optionally, the US image and the CTA image are both marked at regions of interest. In one example, roughly at the center of the aortic valve, roughly at the center of the mitral annulus, and/or roughly at the apex. Optionally, the CT image is marked roughly at the top of the left atrium. Optionally, the marking is rough, being at least in proximity to the region of interest, for example, within about 1 centimeter (cm), or about 2 cm, or other smaller, intermediate or larger distances. Advantageously, the method works even if the marking is not exactly at the correct location. The markings may be adjusted if different organs and/or different parts of the heart are imaged. More markings may be used, and/or different landmarks may be marked.

Optionally, the US and CTA images are independently marked, for example, by different people, at different times and/or without reference to the other image.

Figure 2:
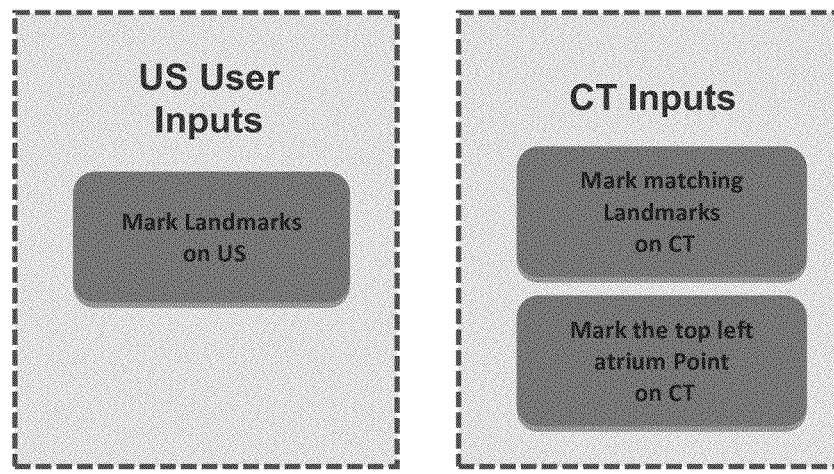

Attention is now diverted to FIG. 2, which is a graphical representation of the US and CT markings, in accordance with exemplary embodiments of the present invention.

Referring back to FIG. 1B, at 110, optionally, an initial rigid registration is calculated based on the landmarks. Optionally, the landmark registration is based on a closed form estimation of the rigid transformation that produces a minimum of the least square error of the landmark points (restricting translation and rotation matrix). The initial landmarks registration may provide an initial transform for subsequent tissue volume registration stages.

Alternatively, an automatic matched landmarks detection program, and/or other automatic alignment methods may replace the user marking and/or landmark registration stage.

At 112, the CTA image is independently volumetrically represented. Optionally, the CT image is segmented into chamber and/or vessels of the heart. In one example, the CT image is segmented into the left ventricle, left atrium and/or aortic root. Additional features may be automatically detected, such as the Mitral annulus, right ventricle and atrium and additional valves.

At 114, the CTA image is segmented into the heart tissue (e.g., myocardium) around the segments of box 112.

Optionally, the segments of box 112 are used as an anatomic guide for the CTA myocardium segmentation process, as will be described in greater detail below.

Optionally, the CT segments and/or volumetric representations are transformed to be more similar to the US modality representation, optionally, taking into account US acquisition artifacts, for example, expected US transducer position and/or beam direction, as will be described in greater detail below.

Optionally, at 116A, a mask is created for the registration of the CTA image. Optionally, the CTA image is masked with the region around the heart tissue segmentation near the left ventricle, left atrium and/or aorta. Optionally, the mask is calculated to restrict the registration to a subset of relatively better correlated tissue regions. Advantageously, as the US and CT representations may be more similar in the subset tissue regions, the registration outliers percentage may be reduced.

At 118, the US image is independently volumetrically represented. Optionally, the representation comprises enhanced heart tissue (e.g., myocardium) for the whole region captured by the US probe.

Optionally, the enhanced representation of the heart tissue and/or blood pool is calculated for the US image so that the representation is highly correlated to the CT representation.

Optionally, the CTA and/or US representations are calculated so that the representations will be similar in terms of a registration cost function.

Optionally, at 116B, the US image is masked for the whole US volume shape. Optionally, the mask is calculated around tissue regions, so that the US and CT representation are more similar with less outlier data.

At 120, a first volumetric registration is calculated. Optionally, the estimated transformation is rigid. Optionally, the registration utilizes a volumetric intensity registration algorithm.

Optionally, the registration is performed for the representations of the CT and/or US volumes, in which the heart tissue is enhanced, and/or noise is suppressed in the chambers and/or vessels.

Optionally, the CT representation covers a large area around the initial segmented regions of interest, optionally from block 112. Optionally, the representation is of tissue volume around these segments that also includes shape information of nearby chambers and vessels (e.g., right side structures). Advantageously, the additional information may improve the registration results.

Optionally, the US representation is for the whole captured volume. The representation is independent of the CTA analysis and/or initial transform. Advantageously, the method is independent of user inputs and/or previous algorithm stages. Advantageously, as the CT volumetric representation may have insignificant dependence on the user markings, the robustness of the registration increases. For example, the user markings may not be exactly at the correct anatomical points.

Advantageously, the representations may use data from large volume regions, and therefore may be less sensitive to partial coverage, which may be common in US 3D images.

Optionally, the normalized cross correlation (NCC) cost function is used for the registration of the US and/or CTA volumes. Advantageously, the NCC may be used because the CT and US representations are prepared for high 3D image correlation.

Optionally, the optimized transform is the rigid transformation or non-rigid transform. Optionally, the non-rigid transformed is constrained affine registration. Optionally, the affine transform correction is constrained to identity.

Optionally, the minimization of the cost function in the transformation parameter space is calculated using a variant of the Gradient Decent Algorithm. Optionally, the registration uses pre-calculated masks, potentially to reduce outliers regions.

Optionally, sparse volume sample sets from the representations are calculated, potentially leading to higher registration performance.

Optionally, the registration is provided with a parametric CT volume representation that represents a range of possible CT deformation cases, potentially for higher similarity to the US image. The registration algorithm may decide the best representation case as part of the transform optimization. Optionally, the selection may be done in terms of minimum cost function (e.g., maximum correlation) and/or other cost function based on the transform and/or representation parameters.

Optionally, the registration is performed in multi-resolution approach, potentially increasing robustness.

At 122, the segments of the CTA image obtained from box 112 are used as an atlas for US shape segmentation of the corresponding heart chambers and/or vessels, for example, the left ventricle, the left atrium and/or the aortic root. Optionally, the CTA segments are transformed using the transformation results of block 120.

At 124, the CT segments obtained at box 112 are processed to account for differences between the CT and US imaging modalities. Optionally, a CT representation is prepared that takes into account US acquisition artifacts, for example, expected US transducer position and/or beam direction.

Optionally, shape analysis of the CT is performed to create surface shapes that are similar to the US shapes, according to an US artifacts estimation model.

At 126, the US shapes obtained at box 122 and the CT shapes obtained at box 124 are used to calculate registration in a staged manner.

Optionally, the shape registration is performed in two levels of details. Advantageously, the two levels may increase robustness.

The first stage is a rigid registration. Optionally, the refined stage uses non-rigid registration. Optionally, the non-rigid registration is constrained affine registration.

Optionally the shape registration uses a variation of the iterated closest point (ICP). The ICP may be used for registration of geometrical shapes.

Optionally, the US and CT images are registered according to geometrical shapes from the US segment and the CT segments. Optionally, additional geometrical 3D features may be aligned. Optionally, representations of sub-parts of the endocardium are aligned. Alternatively or additionally, other geometrical features are used for alignment, for example, skeletal sub surfaces of the myocardial tissue, large vessel centerlines, valve center points and/or other geometrical structure.

Attention is now diverted to FIG. 16, which is an exemplary image of a rigid volumetric registration, in accordance with exemplary embodiments of the present invention. The image is a fusion of CT (green) and US (green), for the 3 principle axis slices.

Referring back to FIG. 1B, optionally, at 128, non-rigid registration refinements are calculated, for example, an affine transform. Advantageously, the non-rigid refinement accommodates small deformations.

Optionally, regularization of the affine transform is performed. Optionally, an affine correction transform to the rigid transform (box 126) is calculated with a penalty term added to the calculation. Optionally, the penalty term constrains the correction transform to be close to the identity transform.

Optionally, the CT image representation is assigned weights to improve accuracy of local registration according to a cost function, for example, the ICP. Optionally, the ICP is calculated with a weighted cost function. The weights may enable using prior knowledge of inaccuracies and/or may be used to mark certain regions of the heart as important. Weights may be applied to the CT and/or US input shapes, for example, as described with reference to box 710 of FIG. 7.

Optionally, an ICP variant algorithm uses labeling of anatomical parts from the US and/or CT segmentation stages to restrict the alignment of the shape parts.

Different anatomical coverage and/or differences in the US and CT modalities may make some parts of the shapes incompatible and potentially outliers to the alignment process. Optionally, the ICP algorithm variant uses automatic outlier regions rejection, in order to discard regions in which different information is available in the input representations. Optionally, the ICP algorithm is used with a variant of the trimmed least squares approach to select registration inliers subsets through the estimation process.

Attention is now diverted to FIG. 20, which is an exemplary image of ICP shape registration, in accordance with exemplary embodiments of the present invention. The image is an example of outlier robust ICP registration for endocardium surface shapes of the aorta base, left ventricle and left atrium. The CT segment is shown is white. A distance map of the US closest point is shown in color. Rejected outliers are shown in red.

Attention is now diverted to FIG. 21, which is an exemplary image of fusion of the constrained affine registration refinement, in accordance with exemplary embodiments of the present invention. The CT image is shown in gray. The US image is shown is green.

Referring now back to FIG. 1B, at 130, the registered CT and US images are displayed to a user. Optionally, the US image is overlaid on the CT image. Alternatively or additionally, the US and CT images are shown adjacent to one another (e.g., side by side), or in a checkerboard manner.

Optionally, the CT image is obtained a period of time before the US image, for example, several days or weeks before, and stored until registration. Optionally, the US image is obtained in real-time. Alternatively, the US image is obtained a period of time before the registration. CT scans may be expensive and difficult to obtain in a real-time manner, while US machines are generally low cost and available. Network connectivity may allow access to stored images at any time.

Advantageously, the registered images may be used, for example, for diagnosis based on fused CT and US data, for physical condition follow up, for image guided procedures (e.g., the detailed CTA scan may serve as the anatomical map, and the US may provide real-time guidance during the procedure), and/or motion compensation during CT reconstruction using the US 4D images.

Reference will now be made to FIGS. 3-7, which are flowcharts that provide additional details to some of the boxes of FIG. 1B. Inventors tested the automated methods described herein using real cardiac data. Reference will also be made to FIGS. 9-21 which are exemplary images obtained according to the computerized methods described herein.

Figure 3:
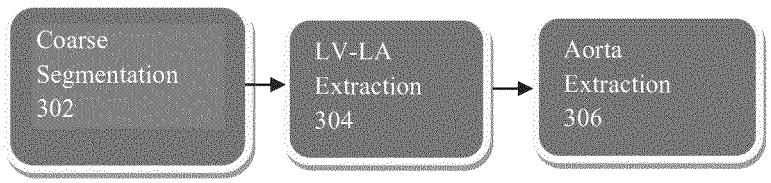

Reference is now also made to FIG. 3, which is a flowchart of an automated method for model-less segmentation of the heart chambers and/or vessels, for example of box 108 of FIG. 1B, in accordance with exemplary embodiments of the present invention.

At 302, a rough model-less segmentation is calculated for the CT image. Regions which are not part of the heart may also be segmented. Advantageously, the rough segmentation is calculated without anatomical insight.

Optionally, the segmentation is performed using an intensity cutoff. Optionally, the cutoff is selected so that regions enhanced by the injected contrast agent are detected. Optionally, the cutoff is selected according to Hounsfield (CT) values.

Optionally, the cutoff is manually selected, for example, by a user clicking on a contrast enhanced region. Alternatively or additionally, the cutoff is automatically detected by software. Alternatively or additionally, the cutoff is preset.

Optionally, the image is thresholded using the selected cutoff value.

Optionally, the thresholded areas which do not belong to the anatomical regions of interest are removed. Optionally, areas which are not part of the interconnected region that includes the center of the mitral annulus are removed.

Optionally, holes in the interconnected region are closed. For example, local minima not connected to the boundary of the image are filled.

Figure 9A:
Figure 9B:
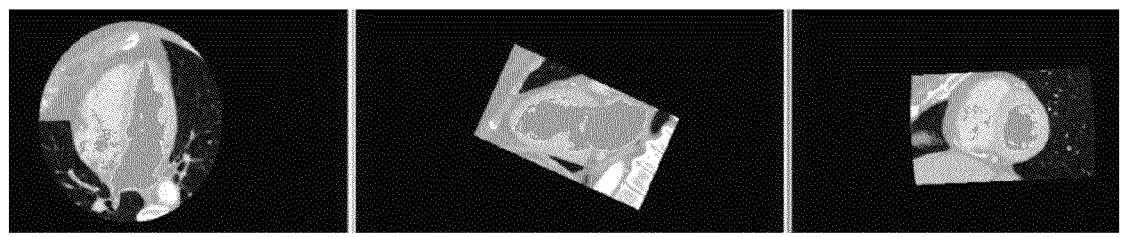

Attention is now diverted to FIG. 9A, which is an exemplary CTA heart image taken using axial (left), sagital (middle) coronal (right) slices, in accordance with exemplary embodiments of the present invention. FIG. 9A illustrates the method of box 302. The images are threshold based segmentation results (shown in color). Of note is that other bright regions that are not part of the heart were also segmented (e.g., spine, ribs). FIG. 9B is the segmentation result after removal of the non-heart connected components of FIG. 9A. Of note is that some misclassification remains. The misclassification will be resolved in boxes 304 and/or 306.

At 304, the left ventricle and the left atrium (LV-LA) are segmented together from the interconnected component. Advantageously, the LV-LA extraction is model-less, without an anatomical model and/or atlas.

Optionally, verification is performed to ensure that the user markings (box 108) of the apex and top of the left atrium reside within the enhanced region of the scan.

Optionally, user markings outside the enhanced region of the scan are corrected and attached to expected locations.

Optionally, the user markings are used as seed points to run the colliding-fronts algorithm to automatically segment the region between the markings. In some cases, the colliding-fronts algorithm may not reach the boundaries of the LV and/or LA, instead producing a smaller segment. Refinement of the segmented region at the boundaries may help assure that the segmentation describes the unreached regions correctly.

Figure 10:
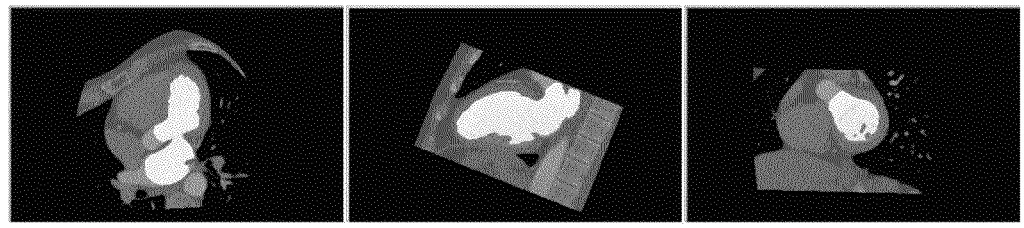

Attention is now diverted to FIG. 10, which comprises the segmented left ventricle and left atrium (shown in yellow) of FIG. 9B, using the method of box 304.

Referring back to FIG. 3, optionally, at 306, the aorta is extracted. Optionally, the aorta is detected using the segmentation results of boxes 302 and/or 304. Advantageously, the segmentation is model-less. No additional user input is required, and no heart atlas is required.

Without being bound to theory, the structures of the left side of the heart (i.e., left ventricle and/or left atrium), which may be captured well on 4D US images, have cylindrical symmetry along the long axis (i.e., apex-atrium direction). The ascending aorta may be an important feature for registration, as the aorta breaks the symmetry of the left side of the heart.

Optionally, the LV-LA segment (of 304) is subtracted from the coarse segment (of 302). Optionally, noise is removed.

Optionally, artifacts joining the left side of the heart to the right side of the heart are removed.

Optionally, the aorta is identified. Optionally, the aorta is identified as the connected component that is closest to the center of the aortic valve marking (of box 108).

Attention is now diverted to FIG. 11A, which is a model of the refined segment that includes the LV, LA and ascending aorta, in accordance with exemplary embodiments of the present invention. FIG. 11B is the result of subtracting the LV-LA segment from FIG. 11A. FIG. 11C is the segmented aorta component.

Figure 4:
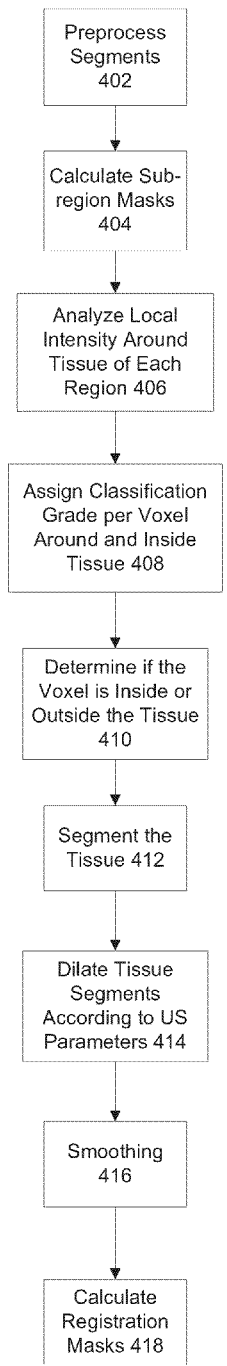

Reference is now also made to FIG. 4, which is a flowchart of an automated method for CT model-less segmentation of the heart tissue, for example of box 114 of FIG. 1B, in accordance with exemplary embodiments of the present invention. The method identifies a heart tissue structure estimation of the region around the LA, LV and/or the base of the aorta. Optionally, shape analysis is used to estimate a segmentation of the heart tissue around each of the LA, LV and/or aorta. Optionally, for a specific organ case, prior information regarding geometrical attributes, such as expected tissue width range, may be used by the algorithm.

At 402, the chamber and/or vessel segments for tissue segmentation are selected, for example, the LA, LV and/or ascending aorta. Optionally, the segments are selected from the output of box 112 of FIG. 1B.

Optionally, the selected segments are preprocessed.

Optionally, for an input of LV and/or LA segment, approximated LV and LA segments are created using the plane through the mitral landmark that is perpendicular to the mitral-apex connecting line.

Optionally, smoothed segments are calculated using morphological filters. Optionally, the segments are closer to the endocardium, with respect to the input segments (i.e., the inner surface of the LA, LV and/or aorta). Optionally, the segments do not include modality dependent high detail data of the inner LV tissue, for more registration robustness.

Optionally, at 404, masks are calculated for sampling values of the internal region of the chambers, the inner vessel region, heart tissue and outer regions near the tissue. Optionally, masks are calculated for intensity analysis. Optionally, the masks are calculated using distance maps of the inputs segment (e.g. from 112) and/or preprocessed segments of box 402.

Optionally, at 406, the intensity around the heart tissue of each region is analyzed. Optionally, the intensity is analyzed using local statistics for sub-organ regions, for example, using the multiple thresholds Otsu method. Advantageously, the local analysis may enable adaptation to the organ properties and/or to the local CTA intensity enhancement.

Optionally, at 408, intensity gradients are analyzed. Optionally, voxels are evaluated around and/or inside the tissue. If the tissue can't be distinguished from the local neighborhood using the input data evidence, prior assumptions on the tissue shape may be used.

Optionally, maps are created for local evaluation of myocardium intensities, for example, using 3D Voronoi diagrams of in tissue and out of tissue sample sets.

Optionally, a classification grade of being inside the tissue is assigned for each voxel. Optionally, the classification grade is interpolated for the whole volume. Optionally, a linear interpolating function is used for a smoothed unified function.

At 410, the voxel is determined to be inside or outside the tissue according to the classification grade.

At 412, the tissue is segmented using the smoothed unified function.

At 414, CT representations are created that have increased similarity to the US tissue volumetric representation, for example as described in box 114 of FIG. 1B.

Without being bound to theory, the US image may have some characteristic artifacts, which may be dependent on the transducer location and/or angle. For example, for the apical view, inventors discovered that the US tissue signal was more spread into the heart chambers relative to the CT image. This may be due to the angular data acquisition, artifacts and/or noise properties. The effects may be stronger for increasing distance from the transducer.

Optionally, the tissue segments are dilated. Optionally, the degree of dilation is related to the approximated US sensor position and/or beam direction and/or US focal zone. Optionally, the extent of the dilation is tuned according to an expected artifacts model.

Optionally, a parametric deformation model is defined. Optionally, the model may relate the level of artifacts and/or to the quality of acquisition. Optionally, the deformation parameters are determined as part of the volume registration stage (e.g., box 120 of FIG. 1B), for example, by searching for the best case in terms of minimum cost function (e.g., maximum correlation of the CT and US representations and/or other criteria).

Optionally, at 416, the segments are smoothed, for example, using Gaussian filtering. Optionally, small noise volume components are cleaned, for example, using connected component analysis. Advantageously, the smoothing may make the representation more similar to the US representation in terms of high 3D image correlation.

Optionally, at 418, registration masks are created such that the registration will use the segmented tissue regions and nearby regions.

Attention is now diverted to FIG. 12, which is an exemplary image of CTA heart tissue analysis, in accordance with exemplary embodiments of the present invention. The image is a fusion of CT (shown in gray) and US (shown in green).

Attention is now diverted to FIG. 13, which is another exemplary image of CTA tissue analysis, in accordance with exemplary embodiments of the present invention. As the tissue includes geometric information of nearby chambers and/or vessels, the registration may be supported by alignment of additional structural information in the image, for example, the main vessel from the right ventricle to the lungs.

Attention is now diverted to FIG. 14, which is an exemplary image of a CT tissue representation, in accordance with exemplary embodiments of the present invention. The image is a fusion of CT (gray) and US (blue).

Figure 5:
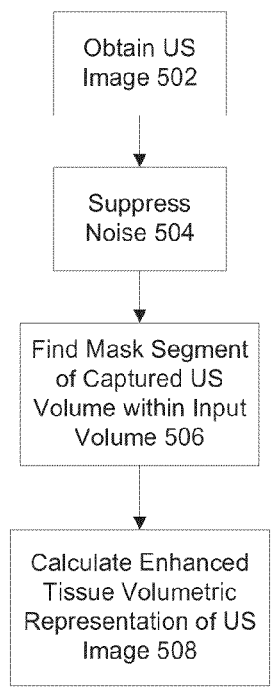

Reference is now also made to FIG. 5, which is a flowchart of an automated method for US model-less segmentation of the heart tissue, for example, of box 118 of FIG. 1B, in accordance with exemplary embodiments of the present invention. The method finds a volumetric enhanced representation of the US image that may be correlated to the CT representation, for example, in terms of the volumetric registration cost function.

At 502, an US image is obtained, for example, after being marked by the user in box 106 of FIG. 1B.

Optionally, at 504, noise in the US volume image is suppressed. Optionally, speckle noise is suppressed, for example, by processing with a Gaussian filter, median filter, or other suitable filters.

Optionally, at 506 a mask segment of the captured US volume within the input image volume is calculated. Optionally, background zero voxels are removed, for example, by applying a threshold. Optionally, holes with zero intensity are closed and/or artificial marks (e.g., ECG information) are removed, for example, by applying morphological operators. Optionally, the mask is eroded so that only the inside portion of the captured volume is used.

At 508, an enhanced volumetric representation of the US image is calculated. Optionally, the enhanced representation comprises the enhanced heart tissue shape, with noise in the heart chambers and/or vessels being suppressed.

Optionally, the heart tissue is identified from the region inside the chamber and/or vessels, for example, by applying various low pass filters and/or gray-scale morphological operations. Optionally, large scale heart tissue features are enhanced. Optionally, by applying, where applicable, a Laplacian of a Gaussian filter of a large variance in a direction perpendicular to the tissue local shape. Using the above operations, an enhanced image for registration is created with enhanced tissue regions and suppressed chamber noise.

Attention is now diverted to FIG. 15, which is an exemplary image of the enhanced US heart tissue representation, in accordance with exemplary embodiments of the present invention. Three principle axis slices are shown.

Figure 6:
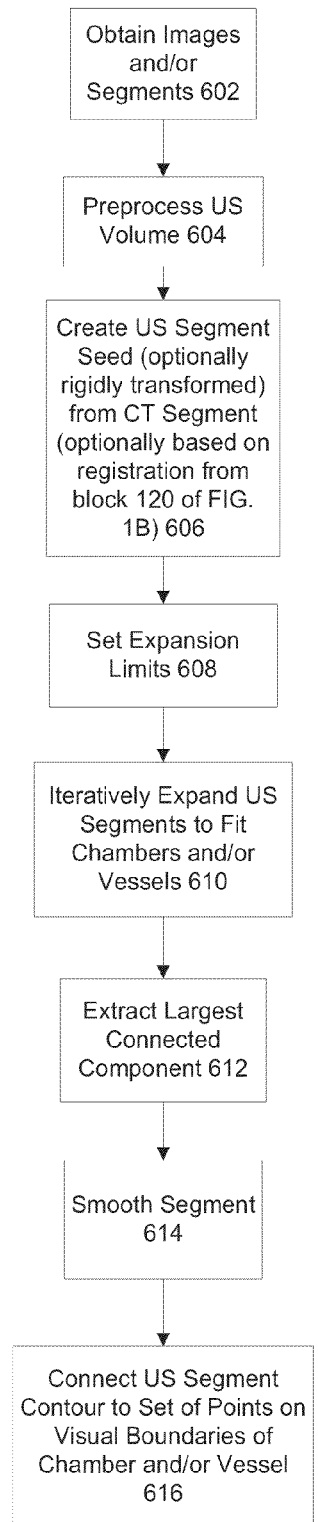

Reference is now also made to FIG. 6, which is a flowchart of an automated method for US model-less segmentation using a CT atlas reference, for example, of box 122 of FIG. 1B, in accordance with exemplary embodiments of the present invention. The method uses the CT segments (e.g., box 112 of FIG. 1B) and the volumetric registration transform (e.g., box 118 and/or 120) as an atlas to find a set of points that define the US 3D volume, visual contour of the left atrium, left ventricle and/or aorta. The method iteratively expands a seed, derived from the CT image, and transformed using the previous stage rigid transformation, to fit the left ventricle, left atrium and/or aorta contour. The method calculates a set of points which represent endocardium sub-surfaces (i.e., surfaces of the heart tissue inside the chambers and/or vessels). The method removes gaps and/or artifacts from the calculated image.

Advantageously, the method overcomes various US artifacts that inflict gaps in the borders of the heart chambers and/or vessels that produce a blurry US image. Typically, only part of the heart may be visible in the field of view of the US transducer, and therefore in the resultant images. Images with only parts of the heart present difficulty in registration with the CT scan.

At 602, transformed CT segments (e.g., LV-LA and/or aorta) are obtained, for example, from the result of box 112 of FIG. 1B. The US volume is obtained, for example, from box 118 and/or 120.

Optionally, external user parameters fitted to the cardiac properties are determined, for example, empirically.

Optionally, at 604, the US volume is preprocessed.

Optionally, the US volume is smoothed, for example, by Gaussian and/or median filters. Optionally, the extent of the smoothing is determined according to the empirically obtained user parameters of 602.

Optionally, the area outside the US transducer acquisition volume is ignored (pixels in this area have a value of zero). Optionally, the area inside the US acquisition volume is smoothed and/or holes are closed, for example by applying morphological open, close and/or erode operations. Advantageously, the image transformation increases the accuracy of the registration.

At 606, an US segment seed is created from the CT segment. Optionally, the CT segment is eroded to form the initial US seed for the iterative US segment expansion process. The CT segments may serve as an atlas. The initial seed segment is aligned to the US image, for example, using the registration result from block 120 of FIG. 1B.

Optionally, at 608, the limits of expansion are set. Optionally, the CT segment is dilated non-uniformly based on anatomical landmarks. Optionally, the dilated CT segment is used as a mask to confine the expansion of the US segment. Optionally, the mask constrains the US segment expansion to the more relevant cardiac regions and/or limits expansion outside the cardiac chambers and/or vessels. Optionally, scale operations are used, potentially increasing the algorithm efficiency.

At 610, the US segment is iteratively expanded to fit the cardiac chamber boundaries, for example, according to the mask of box 608. Optionally, the US segment is derived.

The process starts with the US seed of box 606.

Optionally, a graylevel threshold is applied: $I_i^{th}=I_0^{th}+i\alpha$; where $\alpha$ is a growing factor (e.g., one of the input parameters, found empirically) and i is the iteration index. $I_0^{th}$ is calculated according to US segment intensity average and/or variation.

Optionally, the iteration loop stops when the volume of the expanding US segment satisfies the condition: $V_{us}=\beta V_{CT}$; where $V_{us}$ is the US segment volume, $V_{CT}$ is the CT segment volume, and $\beta$ is a parameter determined empirically and is typically close to 1.

At 612, the largest connected component is extracted.

Optionally, at 614, the segment is smoothed, for example, by applying morphological open operations.

At 616, the US segment contour is converted to a set of points on the visual boundaries of the heart. Optionally, the US segment boundary is converted to a set of points representing sub-surfaces of the endocardium, for example, by using boundary sampling. Optionally, points are removed near the limit of expansion.

Optionally, the method described in FIG. 6 is activated twice. Once for the joint LV-LA segment, and once for the aorta. Optionally, a different set of parameters is used to adjust the algorithm to the segment during each activation.

Attention is now diverted to FIG. 17A, which is an exemplary image of a seed extracted from the CT atlas inside the US image, in accordance with exemplary embodiments of the invention. FIG. 17B is an exemplary image of a dilated US segment obtained from the CT seed of FIG. 17A. FIG. 17C is an exemplary image of a set of points on the visual chamber contour obtained from the dilated US segment.

Figure 7:
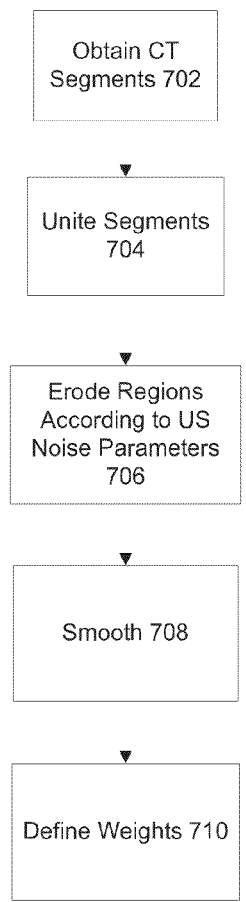

Reference is now also made to FIG. 7, which is a flowchart of an automated method to represent CT shapes for registration, for example, of box 124 of FIG. 1B, in accordance with exemplary embodiments of the present invention.

As 3D models are used to represent the shapes to be registered, the CT and US shapes processed by the ICP need to be similar enough so as to allow accurate registration. However, the nature of CT and US scans is different. Inventors discovered that US boundaries of the LV-LA are eroded relative to those detected in the CTA. In addition, the Aorta may suffer less from this effect. Inventors hypothesize that the reasons for these differences are due to the characteristics of the US transducer and/or the specific selected view-point. Both factors may create noise in the lateral direction, generally aligned with the short axis, which may increase in the organ portions getting further away from the transducer (located at the Apex). Advantageously, the method incorporates the discoveries of the inventors to calculate CT shapes for improved registration with US images.

At 702, the CT segments are obtained, for example, as described in box 112 of FIG. 1B. Optionally, there are two segments for the left side of the heart, a single LV-LA segment and an aorta segment.

At 704, the LV-LA and aorta segments are united.

At 706, the LV-LA region is eroded. Optionally, the LV-LA region is eroded in accordance with lateral noise in the US image. Advantageously, the eroded region compensates for the lateral US noise.

Alternatively or additionally, the aorta region is eroded. Optionally, the aorta region is eroded to a smaller extent than the LV-LA region.

Optionally or additionally, the LA region of the LV-LA segment is eroded to a smaller extent than the LV region of the LV-LA segment. The erosion may be performed to compensate for additional noise further from the US transducer (located at the apex).

Optionally, at 708, the resulting segment is smoothed. Optionally, the smoothing is calculated to allow for stable registration by the ICP algorithm, potentially avoiding convergence to local minima.

Attention is now diverted to FIG. 18A, which is an exemplary model based on the united LV-LA and aorta segments, for example, as in box 704, in accordance with exemplary embodiments of the present invention. FIG. 18B is an image of the model of FIG. 18A after being eroded, for example, as in box 706. FIG. 18C is an image of the model of FIG. 18B after being smoothed, for example, as in box 708.

Referring now back to FIG. 7, optionally, at 710, weights are defined. Optionally, the defined weights will be used by the ICP algorithm during the registration refinement (e.g., box 128 of FIG. 1B). Optionally, regions with relatively higher weights will be given greater importance and may result in better local registration. Optionally, specific anatomical regions that require more attention are assigned a relatively higher weight.

Optionally, weights are assigned to the selected region, for example, the left ventricle. Alternatively, other weighing strategies may be used, for example, according to the desired applications, for example, increased weights being assigned to the aorta, mital annulus, apex, and/or other anatomical regions.

Optionally, the model of box 708 is clipped to leave only the selected region, for example, the left ventricle. Optionally, clipping is calculated by using the mitral and/or apex user markings. Optionally, high weights are defined at the coordinates of the points of interest of the left ventricle.

Attention is now diverted to FIG. 19, which is an exemplary image of three planes of a CTA scan with relatively higher weights marked in red, in accordance with exemplary embodiments of the present invention.

Figure 8:
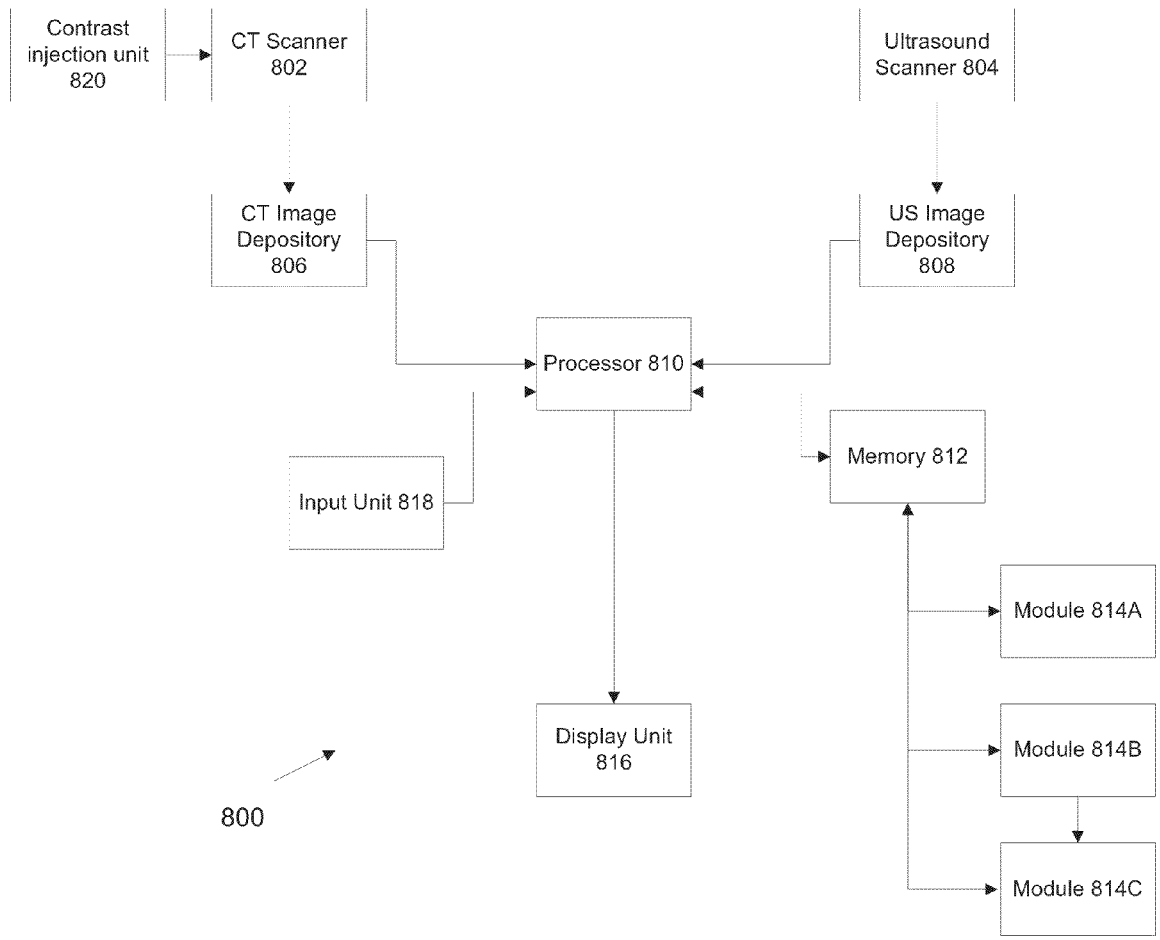

Reference is now made to FIG. 8, which is an exemplary system 800 for model-less segmentation of CT and US images, in accordance with exemplary embodiments of the present invention. System 800 may be used to execute the computerized methods described with reference to FIGS. 1-8.

Optionally, system 800 comprises a CT scanner 802 for scanning a patient. Optionally, CT scanner is designed to perform cardiac CT scans, for example, multidetector computed tomography (MDCT), and/or electron-beam computed tomography (EBCT). Alternatively, the CT scan is performed for regions that include the heart, but not necessarily focused on the heart, for example, a chest CT scan.

Optionally, a contrast injection unit 820 is synchronized with the CT scan. The CT scan may be timed with the contrast injection in the patient so that the scan is performed when contrast is most likely concentrated in the left side of the heart.

Optionally, CT scanner 802 is in electrical communication with a depository for CT images 806, for example, memory residing in a local and/or remote server. Image data from CT scanner 802 is saved on depository 806.

Optionally, system 800 comprises an US scanner 804 for performing diagnostic ultrasound scans of the patient. Optionally, US scanner 804 is designed to obtain 3D US images.

Optionally, US scanner 804 is in electrical communication with a depository for US images 808. Image data from US scanner 804 is save on depository 808.

System 800 comprises a processor 810 designed to execute computer instructions stored on non-transitory computer readable media. Optionally, processor is in electrical communication with depositories 806 and/or 808 so that processor may process the stored CT and/or US images.

Processor 810 is in electrical communication with a memory 812. Memory 812 has stored thereon modules 814A-C for model-less segmentation and registration of the CT and/or US images. The number of modules may vary, for example, less than or more than three. Examples of modules 814A-C:

- a module for obtaining at least one US image and at least one CT image of at least a portion of an organ;
- a module for identifying a CT image segment of the at least one CT image that depicts at least one fluid filled chamber of said organ;
- a module for identifying an US image segment of the fluid filled chamber in the at least one US image;

a module for correlating between the at least one US image and the at least one CT image by processing the at least one US image by iteratively expanding the CT image segment so that the expanded CT image segment is correlated with the visual boundaries of the US image segment;

a module for transforming the at least one CT image according to an estimated US transducer position and estimated US beam direction related to the at least one US image so that at least one of shape and volume of the organ in the CT image is adapted with at least one of shape and volume of the organ of the US image, to form a CT image representation which is correlated with the at least one US image;

a module for registering the correlated US image and the correlated CT image to form a registered image; and/or a module for displaying the registered image.

Optionally, one or more display units 816 are in electrical communication with processor 810 is adapted to display the CT scan, the US scan, the registered images and/or images in intermediate stages of the model-less segmentation and/or registration. Display unit 816 is, for example, a monitor, or two side by side connected monitors.

Optionally, one or more input units 818 allow an operator to enter commands into processor 810, for example, to mark the images, to select images, to view images and/or to process images. Examples of input unit 818 include: a keyboard, a mouse, a touchscreen, and/or voice recognition software.

The electrical communication described for system 800 may be wired or wireless, for example, network connections. The components may be locally and/or remotely located.

It is expected that during the life of a patent maturing from this application many relevant registration methods and/or systems will be developed and the scope of the term registration method and/or system is intended to include all such new technologies a priori.

Throughout this application, the term CT (e.g., CT images) is not necessarily limited to CT images. The term CT images may be replaced with MR images.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this present invention may be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the present invention, which are, for clarity, described in the context of separate embodiments, may also be provided in combination in a single embodiment. Conversely, various features of the present invention, which are, for brevity, described in the context of a single embodiment, may also be provided separately or in any suitable subcombination or as suitable in any other described embodiment of the present invention. Certain features described in the context of various embodiments are not to be considered essential features of those embodiments, unless the embodiment is inoperative without those elements.

Although the present invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for model-less segmentation and registration of ultrasound (US) with computed tomography (CT) images of a portion of a patient, comprising:

obtaining at least one US image and at east one CT image of east a portion of an organ;

identifying a CT image segment of the at least one CT image that depicts at least one fluid filled chamber of said organ;

identifying an US image segment of the fluid filled chamber in the at least one US image;

correlating between the at least one US image and the at least one CT image by processing the at least one US image by iteratively expanding the CT image segment so that the expanded CT image segment is correlated with the visual boundaries of the US image segment;

transforming the at least one CT image according to an estimated US transducer position and estimated US beam direction related to the at least one US image so that at least one of shape and volume of the organ in the CT image is adapted with at least one of shape and volume of the organ of the US image, to form a CT image representation which is correlated with the at least one US image;

registering the correlated US image and the related CT image to form a registered image; and displaying the registered image;

wherein identifying the CT image segment of the at least one CT image comprises model-less segmenting the CT image into the CT segments, wherein model-less segmenting the CT image comprises:
coarsely segmenting the CT image using a Hounsfield value threshold so that contrast enhanced regions that are connected and include a mitral annulus marking are identified;
extracting from the coarsely segmented image a left atrium (LA) and a left ventricle (LV) using apex and atrium markings; and
subtracting the LA-LV segment from the coarse segment and detecting the connected component closest to an aortic valve marking to extract the aorta.

2. The computerized method of claim 1, wherein the organ comprises a heart.

3. The computerized method of claim 1, wherein transforming the at least one CT image comprises dilating segments of the organ in the CT image.

4. The computerized method of claim 1, further comprising eroding the CT chamber segments to fit within the chamber of the US image.

5. The computerized method of claim 1, wherein transforming the at least one CT image comprises uniting the CT segments and differentially eroding the united CT segments to compensate for US noise.

6. The computerized method of claim 1, further comprising:
identifying volumetric representations of the chambers and surrounding tissue in the CT segments and of the US image;
registering the identified volumetric representations to provide an initial rigid transformation; and
wherein correlating comprises correlating between the at least one US image and the at least one CT image by processing the at least one US image by iteratively expanding a rigid transformed seed segment based on the CT image segment and said initial rigid transformation, so that the expanded CT image segment is correlated with the visual boundaries of the US image segment.

7. The computerized method of claim 1, further comprising enhancing organ tissue of the US image by enhancing the organ tissue of the whole captured region, to create a US volumetric representation for registration.

8. The computerized method of claim 1, further comprising segmenting the tissue of the organ of the CT image by locally analyzing intensity of the tissue of each region, to create a CT volumetric representation for registration.

9. The computerized method of claim 8, wherein segmenting the organ tissue comprises assigning a classification grade to voxels around and inside the organ tissue so that voxels are determined to be inside the organ tissue or outside the organ tissue according to the classification grade.

10. The computerized method of claim 8, wherein the CT representation is dilated to compensate for US noise, for increasing similarity with the US image.

11. The computerized method of claim 10, further comprising using a parametric model to estimate the parameters as part of the registration.

12. The computerized method of claim 1, wherein the CT image representation is assigned weights to improve accuracy of local registration according to a cost function.

13. The computerized method of claim 1, wherein the registering is performed using rigid volumetric intensity registration, and further comprising applying additional non-rigid constrained affine registration correction to accommodate small deformations.

14. The computerized method of claim 1, wherein registering comprises registering with outliers rejection.

15. The computerized method of claim 1, wherein registering comprises registering with automatic matched anatomical parts labeling constrains.

16. A system for model-less segmentation and registration of ultrasound (US) with computed tomography (CT) images of the heart, comprising:
a processor; and
a memory in electrical communication with the processor, the memory having stored thereon:
a module for obtaining at least one US image and at least one CT image of at least a portion of an organ;
a module for identifying a CT image segment of the at least one CT image that depicts at least one fluid filled chamber of said organ by model-less segmenting the CT image into the CT segments by:
coarsely segmenting the CT image using a Hounsfield value threshold so that contrast enhanced regions that are connected and include a mitral annulus marking are identified;
extracting from the coarsely segmented image a left atrium (LA) and a left ventricle (LV) using apex and atrium markings; and
subtracting the LA-LV segment from the coarse segment and detecting the connected component closest to an aortic valve marking to extract the aorta;
a module for identifying an US image segment of the fluid filled chamber in the at least one US image;
a module for correlating between the at least one US image and the at least one CT image by processing the at least one US image by iteratively expanding the CT image segment so that the expanded CT image segment is correlated with the visual boundaries of the US image segment;
a module for transforming the at least one CT image according to an estimated US transducer position and estimated US beam direction related to the at least one US image so that at least one of shape and volume of the organ in the CT image is adapted with at least one of shape and volume of the organ of the US image, to form a CT image representation which is correlated with the at least one US image;
a module for registering the correlated US image and the correlated CT image to form a registered image; and
a module for displaying the registered image.

17. The system of claim 16, further comprising:
a user input unit in electrical communication with the processor, the user input unit adapted for allowing a user to place markings on the US and CT images; and
a module for registering the at least one US image and the at least one CT image according to the image markings, to form an initial landmark registration that provides data for the identifying of one or both of the US image segment and the CT image segment.

18. A computer program product for computing, the computer program product comprising:
one or more non-transitory computer-readable storage mediums, and program instructions stored on at least one of the one or more storage mediums, the program instructions comprising:
program instructions for obtaining at least one US image and at least one CT image of at least a portion of an organ;
program instructions for identifying a CT image segment of the at least one CT image that depicts at least one fluid filled chamber of said organ;

program instructions for identifying an US image segment of the fluid filled chamber in the at least one US image;
program instructions for correlating between the at least one US image and the at least one CT image by processing the at least one US image by iteratively expanding the CT image segment so that the expanded CT image segment is correlated with the visual boundaries of the US image segment;
program instructions for transforming the at least one CT image according to an estimated US transducer position and estimated US beam direction related to the at least one US image so that at least one of shape and volume of the organ in the CT image is adapted with at least one of shape and volume of the organ of the US image, to form a CT image representation which is correlated with the at least one US image;
program instructions for registering the correlated US image and the correlated CT image to form a registered image; and
program instructions for displaying the registered image;
wherein said program instructions for identifying the CT image segment of the at least one CT image comprises program instructions for model-less segmenting the CT image into the CT segments, wherein said program Instructions for model-less segmenting the CT image comprises:
program instructions for coarsely segmenting the CT image using a Hounsfield value threshold so that contrast enhanced regions that are connected and include a mitral annulus marking are identified:
program instructions for extracting from the coarsely segmented image a left atrium (LA) and a left ventricle (LV) using apex and atrium markings; and
program instructions for subtracting the LA-LV segment from the coarse segment and detecting the connected component closest to an aortic valve marking to extract the aorta.

* * * * *